Patented Sept. 30, 1947

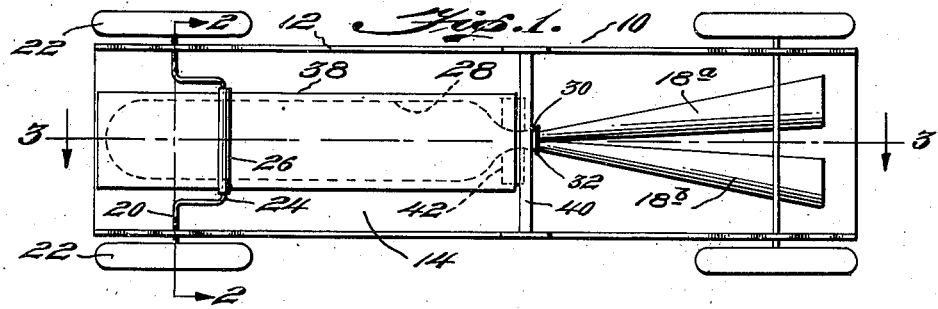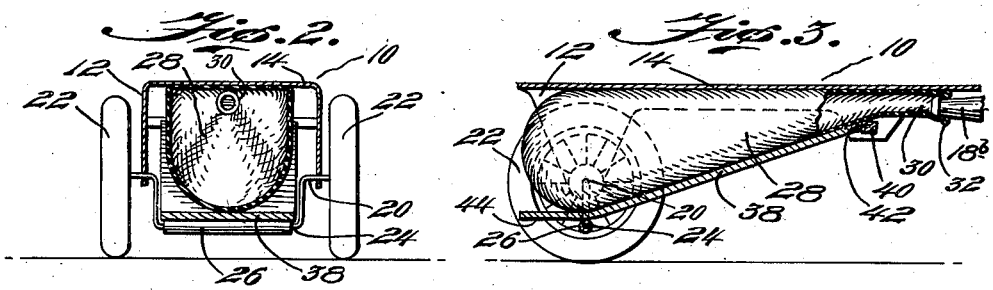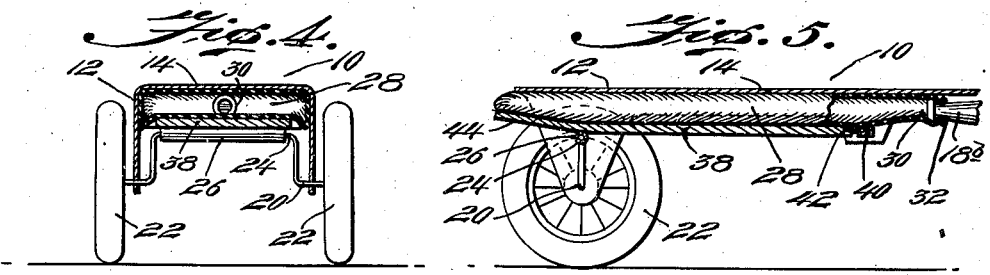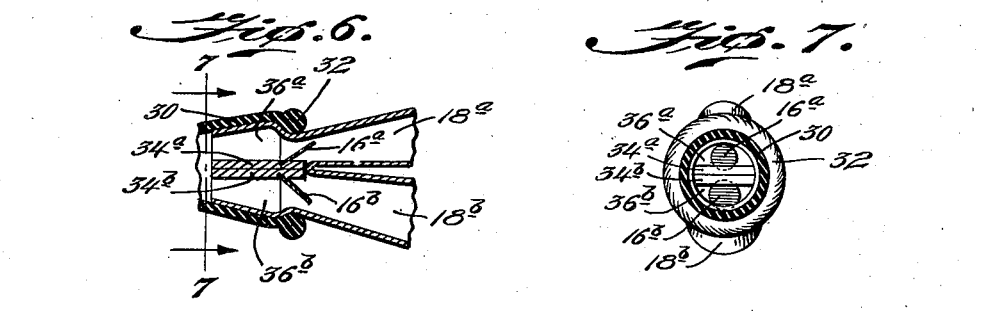

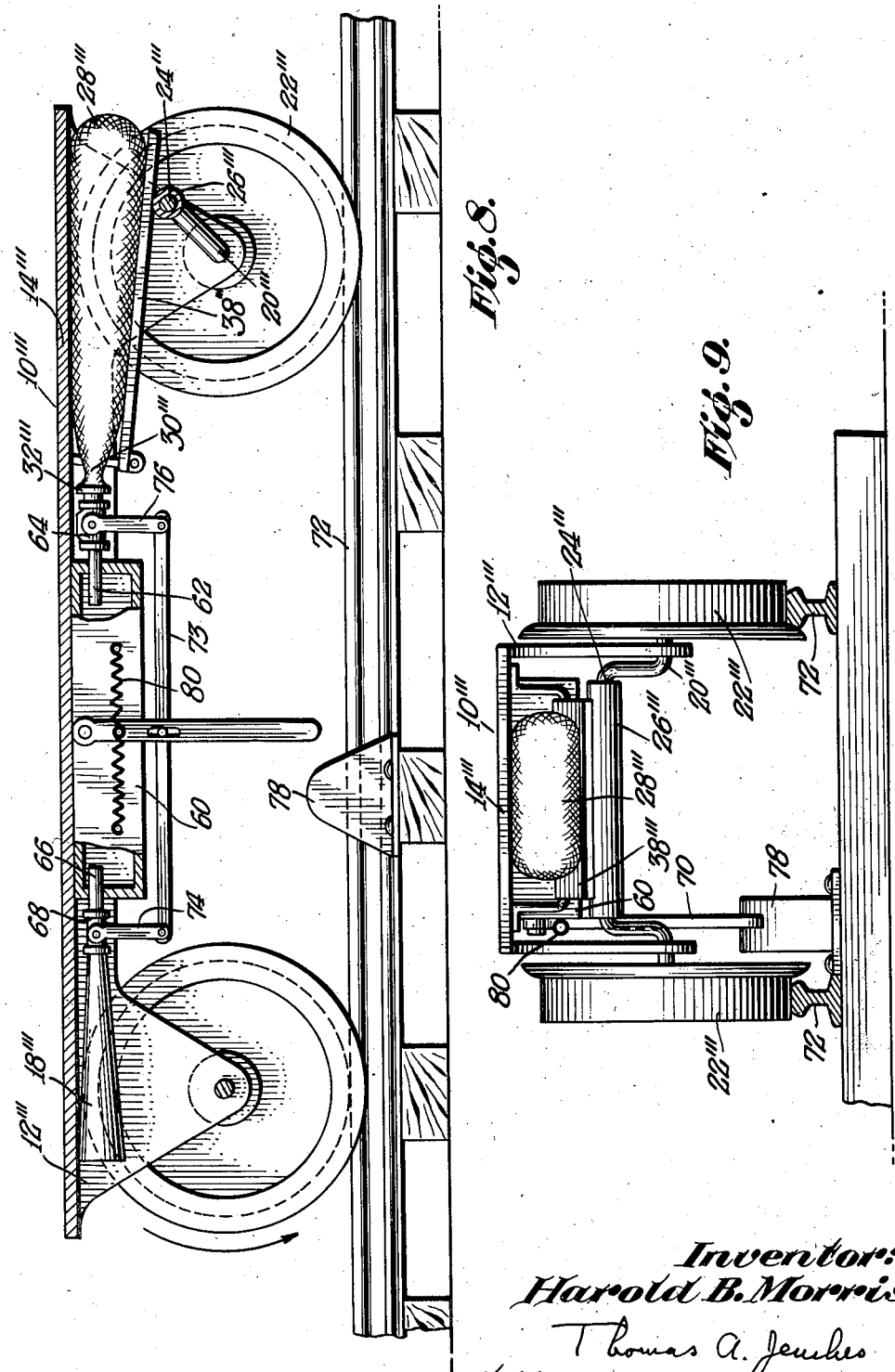

2,428,124

UNITED STATES PATENT OFFICE 2,428,124

WHEELED SOUNDING TOY

Harold B. Morris, Somerset Center, Mass.

Application November 28, 1939, Serial No. 306,513

Section 3, Public Law 690, August 8, 1946.
Patent expires November 28, 1959

5 Claims. (Cl. 46—113)

My invention relates to improvements in wheeled sounding toys. A main object of my invention is to provide a sounding toy actuated by the motion of the vehicle, preferably by the revolution of a wheel thereof in contact with the surface over which it is moved, which will closely reproduce common well-known sounds particularly attractive to children. I have observed that children are particularly attracted by the blend of noises produced by the twin horn type of vehicle horn which has come on the market in the last few years, and that they have a tendency to blow them on every occasion. For this purpose I provide a vibratory reed and horn means for deflecting and concentrating the vibrations of said reeds. To more particularly simulate the noise of a twin horn I preferably employ a plurality of reeds and horn means for said reeds. Another sound which I have found attractive to children is that of a horn commonly used on an electric or Diesel train, which may be easily simulated by an analogous type of reed structure.

By suitable modifications of my invention I may provide a wheeled sounding toy which will simulate the successive notes of a chord or a portion of a musical scale, score or tune, either conjointly, or in such quick succession that they may blend to produce harmony. It is apparent, however, that any type of multiple sounds may be produced conjointly or in any desired time sequence by my invention.

A further object of my invention is to provide a wheeled sounding toy with the above desirable sound characteristics constructed of a relatively small number of inexpensive easily replaceable parts, but which are so simple and strong as to not get out of order or need replacement over a relatively long period of time.

A further object of a different embodiment of my invention is to provide a wheeled sounding toy in which pressure may be built up in a storage reservoir by the motion of the vehicle and which may be actuated at will independently of the motion of the vehicle.

A further object of my invention in any modification thereof is to provide a wheeled sounding toy which can function by any means of locomotion, child power, electrical, mechanical, or otherwise.

These and such other objects of my invention as may hereinafter appear may be best understood from a description of the accompanying drawings which illustrate various embodiments thereof.

In the drawings:

Fig. 1 is a diagrammatic reverse plan view of a wheeled sounding toy constructed in accordance with my invention, in an embodiment comprising a toy automobile.

Fig. 2 is a transverse sectional view taken along the line 2—2 of Fig. 1, but with the air sack preferably employed in inflated position.

Fig. 3 is a detailed central vertical longitudinal sectional view taken along the line 3—3 of Fig. 1 of a portion of the device shown in Fig. 1, but with the air sack partially shown in elevation in inflated position.

Fig. 4 is a transverse sectional view similar to Fig. 2 with the air sack in deflated position.

Fig. 5 is a detailed longitudinal sectional view similar to Fig. 3 with the air sack in deflated position.

Fig. 6 is a detailed horizontal sectional view of the multiple reed structure I employ in the embodiment shown in Figs. 1-5 and adjacent portions of the horns and air sack.

Fig. 7 is a sectional view through the sack along the line 7—7 of Fig. 6, showing the multiple reed structure in end elevation.

Fig. 8 is a central vertical longitudinal sectional view of a modification of my invention comprising a toy railroad train in which the sound device is actuated at will independently of the air sack during motion of said vehicle.

Fig. 9 is a rear elevation of the embodiment of my invention shown in Fig. 8.

In the drawings, wherein like characters of reference generally indicate like parts throughout, 10 generally indicates a wheeled sounding toy constructed in accordance with my invention.

In the embodiments of my invention shown in Figs. 1-7, I have shown my invention as applied to a wheeled sounding toy in simulation of an automobile, whereas in the embodiment of my invention shown in Figs. 8 and 9, I have shown my invention as applied to a wheeled sounding toy railroad car 10''' moving over a toy railroad track 12, although it is obvious that my invention may be applied in simulation of any type of a wheeled toy vehicle in which a sound device is actuated by movement of the vehicle, or otherwise.

Insofar as the principles of my invention are concerned, it is obvious that any type of locomotion may be employed for the wheeled sounding toy, namely, that it may be operated by electrical power, mechanical power, or by the power of a child or other human or animal itself.

In all embodiments shown, the toy includes a frame 12 preferably having a suitable floor 14 mounted thereon. As stated, my invention is particularly adapted to simulate sounds such as that of an automobile twin horn or the horn of an electric train, which have a particular appeal to children, and for this purpose I employ reed means 16 which preferably comprise a plurality of reeds 16a and 16b, each preferably of different vibratory characteristics capable of producing different sounds.

In order to reflect and concentrate the sound produced by the individual reed means, I preferably employ in combination therewith, horn means 18 for said reeds, in my preferred embodiment comprising an individual horn 18a and 18b for each respective reed 16a and 16b. To actuate said respective reed means I provide air pump means actuated by the motion of a wheel 22 to actuate said reed means during a revolution of said wheel. In the embodiment of my invention shown in Figs. 1–7, I have shown a device adapted to actuate each of said reed means 16a and 16b in unison to provide a composite blend of sounds simulative of an automobile twin horn.

In the embodiment of my invention shown in Figs. 8 and 9 I have provided a storage reservoir in which pressure is built up by the movement of the vehicle and in which means are provided actuated at will independently of said means for building up pressure in said reservoir to open the reservoir to actuate the sound device.

In all embodiments of my invention shown, the wheeled sounding toy preferably includes a frame 12 having a floor 14. I preferably employ as my improved air pump and the controlling means therefor, an axle 20 rotatable on movement of a set of wheels 22 having an eccentric crank portion 24 preferably having a roller 26 thereon and a deflatable air sack 28 mounted underneath said floor 14 having an open neck portion 30 preferably having a bead 32 enclosing the smaller ends of said respective horns 18a and 18b therein. As more particularly shown in Figs. 6 and 7, where a plurality of horns are employed adapted to be actuated in unison, the reeds 16a and 16b may be mounted in the side wall 34a or 34b of a respective horn mouth piece 36a or 36b to extend obliquely across said horn. It is obvious that any type of reed structure known in the art may be employed, preferably one as shown of a size less than the area of the horn mouth piece so as to permit an influx of air through said mouth piece from the outer end of the horn for a purpose to be described, and yet capable of vibration on the efflux of air out through said horn to provide the desired sound. As shown more particularly in Fig. 7, it is thus apparent that for this purpose the areas of the reed structures 16a and 16b are less respectively than the areas of the respective mouth pieces 36a and 36b of said horns. While I preferably employ a deflatable air sack 28, it is obvious that any of the equivalent types of air pumps may be employed, such as a standard type of bellows, pistons, diaphragms, etc. I have found that for purposes of cheapness, any suitable type of rubber air sack may be employed, preferably one which is inherently self-inflatable, namely, one in which the rubber tends to resiliently resume its original shape, the air for this purpose of self-inflation in my preferred embodiment passing around the portions of the horn mouth pieces 36a and 36b not taken up by the respective reed structures 16a and 16b. It is obvious, however, that in the embodiments of my invention shown in Figs. 1–7 and Figs. 8–9, a separate compression plate 38 may be employed which may be of a sufficient weight to automatically open up the air sack 28 to permit its self-inflation through said respective mouth pieces. In the embodiments of my invention shown, as stated, I preferably employ the compression plate 38 adapted to be contacted by the roller 26 and which may be of sufficient weight if desired to aid in inflating the sack 28. Said compression plate 38 may be suitably mounted on the frame in any suitable manner. In the embodiment shown, however, for this purpose I have mounted a block 40 transversely of said frame underneath the open neck 30 of said sack 28, and I have provided a spring pivot plate 42 as the means for pivotally mounting said compression plate on said block to permit inflation of said sack, said compression plate being normally urged by gravity to a lower position tending to open up and inflate the sack 28 attached thereto and adapted to be contacted by said roller 26 to be lifted to a raised position to deflate said sack. Said compression plate 38 is provided with a lower surface shaped to oscillate on contact with the roller 26 on said crank portion 24 on rotation of a set of wheels 22 in a clock-wise or a counter-clockwise direction, and for this purpose the rear end 44 of said plate is bent upwardly to a substantially horizontal plane, in any event said compression plate being of a length to extend past the rearmost point of the orbit of rotation of said crank arm 24.

As stated hitherto, I have shown in Figs. 8 and 9 a device employing the features of my invention heretofore described, but in which an independent reservoir 60 is interposed between the air sack 28''' thereof and the reed 16''' thereof or other sound device employed. In this embodiment, a suitable pipe 62 connects the air sack 28''' to said reservoir 60, the air sack 28''' being duly inflated and deflated by the compression plate 38''' duly raised by contact with the crank shaft 24''' thereof during revolution of the axle 20''' in similar manner as in the other embodiments, and lowered by the gravity of the compression plate 38''', or the inherent tendency of the sack 28''' to resume its original position, to charge successive air blasts within said reservoir on each respective rotation of said axle 20'''. In the embodiment shown, the pipe 62 is provided with the reservoir inlet valve 64. The reed 16''' or other sound device employed is connected by a suitable pipe 66 to said reservoir 60, and is provided with a reservoir outlet valve 68 therein. Means are provided actuated at will independently of said air sack during motion of said vehicle to conjointly open said reservoir outlet valve 68 to sound the sound device 16''' and to close the reservoir inlet valve 64 to discharge said air sack 28''' to atmosphere to actuate said sound device 16''' independently of the charging pulsations of said air sack 28''' on each revolution of the crank shaft 24 on movement of the vehicle, said means comprising a lever 70 pivotally mounted on said frame 12 to depend to a position adjacent the track 72 on which the wheels 22''' in this embodiment ride, having a rod 73 pivotally mounted thereon extending longitudinally of said frame and a link 74 connecting an end of said rod 72 to said reservoir outlet valve 68 and a link 76 connecting the other end of said rod to said reservoir inlet valve 64. A suitable projection 78 is provided projecting upwardly from said track 72 adapted to contact said lever 70 to move the rod 72 to open the reservoir outlet valve 66 to provide a charge of air from said reservoir 60 to sound the sound device 16''' at will as desired, and if desired, close the reservoir inlet valve 64 to discharge said air sack 28''' to atmosphere, to thus actuate said sound device 16''' independently of the charging pulsations of said air sack on movement of the vehicle. The spring 80 may be provided to return the lever 70 to a neutral position to be again contacted by a suitable projection 73 projecting upwardly from said track for a repeated sound. If desired, however, the reservoir inlet valve 64 and its suitable connecting link 76 may be dispensed with, thereby providing a sometimes desirable pulsating throb to the sound produced.

It is apparent, however, that any other type of means may be employed to contact the valve 68 and also the valve 64 when employed and that any known type of pneumatically operated toy may be substituted for the sound device.

It is apparent, therefore, that I have provided a novel type of wheeled sounding toy with the advantages described above.

It is understood that my invention is not limited to the specific embodiments shown and that various deviations may be made therefrom without departing from the spirit and scope of the appended claims.

What I claim is:

1. In a wheeled sounding toy, air pump means, a storage reservoir, crank shaft means mounted eccentrically of the axis of a wheel to actuate said air pump means to build up pressure in said reservoir, means normally connecting said air pump means to said storage reservoir having a reservoir inlet valve therein, a vibratory reed sound device, means connecting said sound device to said storage reservoir having a reservoir outlet valve therein, and means actuated at will independently of said air pump means during motion of the vehicle to conjointly open said reservoir outlet valve to sound the sound device and close the reservoir inlet valve to discharge said air pump means to atmosphere to actuate said sound device independently of the pulsations of said air pump means.

2. In a wheeled sounding toy, air pump means, a storage reservoir, crank shaft means mounted eccentrically of the axis of a wheel to deflate said air pump means, means normally connecting said air pump means to said storage reservoir having a reservoir inlet valve therein, a sound device, means connecting said sound device to said storage reservoir having a reservoir outlet valve therein, and means actuated at will independently of said air pump means during motion of the vehicle to conjointly open said reservoir outlet valve to sound the sound device and close the reservoir inlet valve to discharge said air pump means to atmosphere to actuate said sound device independently of the pulsations of said air pump means.

3. In a wheeled toy, air pump means, a storage reservoir, means operatively connecting a wheel to said air pump means, means connecting said air pump means to said storage reservoir, outlet means connected to said storage reservoir having a reservoir outlet valve therein, and means actuated at will independently of said air pump means during motion of the vehicle to open said reservoir outlet valve to actuate said outlet valve.

4. In a wheeled sounding toy, air pump means, a storage reservoir, crank shaft means mounted eccentrically of the axis of a wheel to actuate said air pump means, means connecting said air pump means to said storage reservoir, a sound device, means connecting said sound device to said storage reservoir having a reservoir outlet valve therein, and means actuated at will independently of said air pump means during motion of the vehicle to open said reservoir outlet valve to actuate the sound device.

5. In a wheeled sounding toy, a reed, horn means for said reed, a deflatable air sack having one side thereof mounted adjacent a fixed part of said sounding toy, a compression plate of substantial weight secured to the opposite side of said air sack, means projecting radially from the axle of said wheel to urge said compression plate towards said fixed part to deflate the air sack to actuate said reed, said compression plate being of sufficient weight to positively inflate said air sack after passage of said radially projecting means past said compression plate.

HAROLD B. MORRIS.

REFERENCES CITED

The following references are of record in the file of this patent:

UNITED STATES PATENTS

| Number | Name | Date |
|---|---|---|
| 550,751 | Freeman | Dec. 3, 1895 |
| 360,037 | Murphy | Mar. 29, 1887 |
| 1,032,205 | Gund | July 9, 1912 |
| 1,391,829 | Hartleb et al. | Sept. 27, 1921 |
| 737,514 | Sollman et al. | Aug. 25, 1903 |
| 1,496,709 | Hall | June 3, 1924 |
| 1,330,269 | Kapfer | Feb. 10, 1920 |
| 1,762,461 | Alland | June 10, 1930 |
| 1,496,709 | Hall | June 3, 1924 |
| 653,688 | Moody | July 17, 1900 |
| 553,958 | Freeman | Feb. 4, 1896 |
| 742,680 | Kuhlemeier | Oct. 27, 1903 |
| 577,433 | DeLamarre | Feb. 27, 1897 |
| 1,612,561 | Belber | Dec. 28, 1926 |
| 1,247,942 | Enck | Nov. 27, 1917 |
| 802,386 | Foster | Oct. 24, 1905 |
| 2,061,762 | Gillet | Nov. 24, 1936 |
| 1,276,626 | Dickson | Aug. 20, 1918 |

FOREIGN PATENTS

| Number | Country | Date |
|---|---|---|
| 373,047 | Germany | July 26, 1922 |